(No Model.)
A. T. BASCOM.
BICYCLE PEDAL ATTACHMENT.
No. 558,464. Patented Apr. 14, 1896.
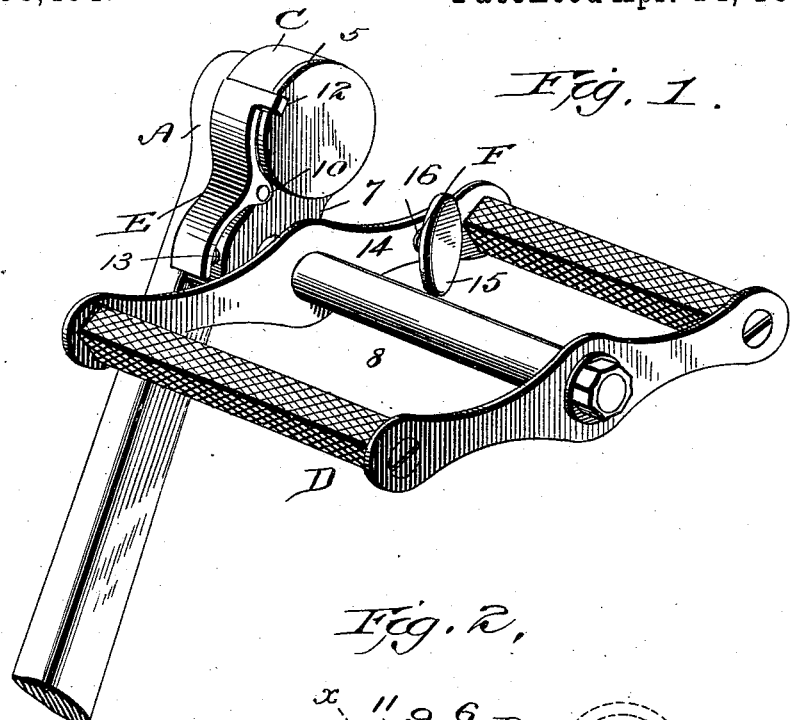
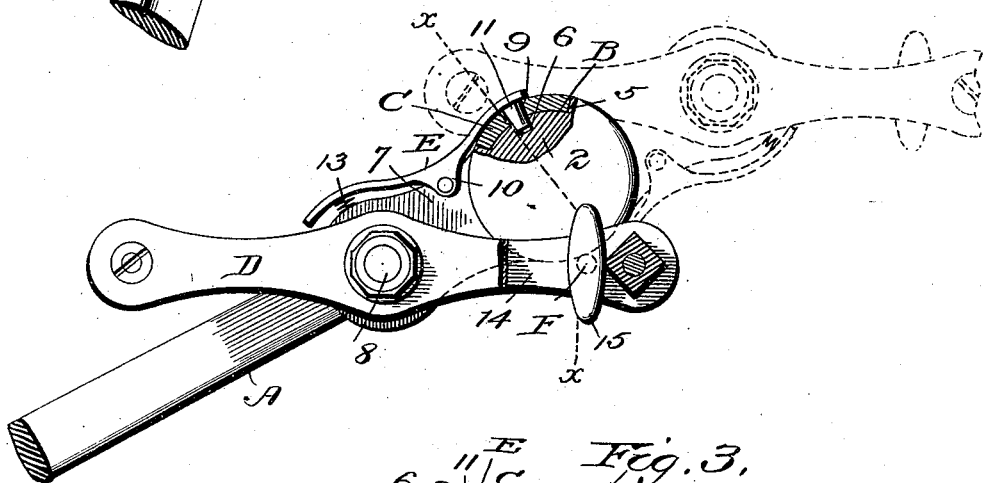
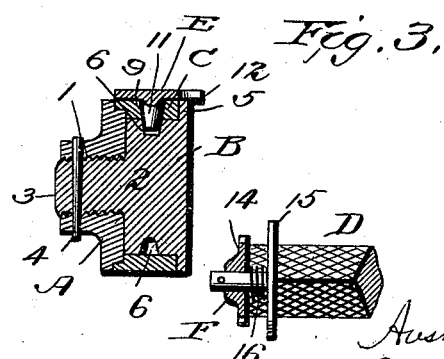
Witnesses
Inventor
Austin T. Bascom
By Wm Hunter Myers,
Attorney

UNITED STATES PATENT OFFICE.

AUSTIN T. BASCOM, OF SIDNEY, OHIO.

BICYCLE-PEDAL ATTACHMENT.

SPECIFICATION forming part of Letters Patent No. 558,464, dated April 14, 1896.

Application filed November 30, 1895. Serial No. 570,581. (No model.)

*To all whom it may concern:*

Be it known that I, AUSTIN T. BASCOM, a citizen of the United States, residing at Sidney, in the county of Shelby and State of Ohio, have invented certain new and useful Improvements in Bicycle-Pedal Attachments, of which the following is a specification, reference being had therein to the accompanying drawings.

My invention relates to improved means for attaching the pedal to the pedal-crank of a bicycle, and it has for its object the production of mechanism whereby the pedal may be attached to the pedal-crank in such manner as to permit the rider to alter the leverage exerted by the pedal while the bicycle is in or out of motion.

The invention will first be described in connection with the accompanying drawings, and then pointed out in the claims.

Figure 1 of the drawings is a perspective view of a pedal-crank having a pedal attached thereto by my improved means, the pedal being shown in the position of least leverage. Fig. 2 is a side elevation of the same on an enlarged scale, the pedal being shown in the position of greatest leverage in dotted lines and one of the side bars of the pedal being removed. Fig. 3 is a sectional view on the line $x\ x$, Fig. 2.

Referring to the drawings, A represents a pedal-crank of usual construction, and having the usual opening or hole 1 in its head or outer end.

B represents what I term an "arbor," its body portion 2 being of slightly less diameter than the head of crank A. This arbor has a short screw-threaded extension 3 adapted to be passed through hole 1 in crank A and be secured thereto by a pin 4, and is also formed with a flange 5. In the body portion of the arbor is formed two diametrically-opposite holes 6, for a purpose hereinafter described.

C is a collar adapted to fit snugly on the body portion 2 of the arbor lying between the head of crank A and the flange 5, as shown. This collar is provided with an integral laterally-extending arm 7, in the outer end of which is secured a pedal-pin 8, on which is mounted a pedal D, the collar being formed also with a hole 9, adapted to be turned into register with either of the holes 6 in the arbor.

E represents a lever, provided with a downwardly-projecting lug 10 on each side adapted to be pivotally secured to the arm 7 of collar C. The end of this lever lying above collar C has a downwardly-projecting stud 11, which projects into hole 9 in the collar, and also a laterally-projecting lip 12 for a purpose hereinafter described. The other end of the lever lies normally a short distance above arm 7, and is held in that position by a coil-spring 13, as seen in Fig. 2.

F is a push-pin mounted in one of the side bars 14 of pedal D. The outer end of this pin is provided with a head or button 15, by pressing on which the pin is moved into the path of lip 12 on lever E, so that in the revolution of the crank it will pass under the lip and raise the lever, thus withdrawing stud 11 from engagement with the arbor. A coil-spring 16 between the button 15 and the side bar 14 of pedal D serves to hold the pin in its normal retracted position, as seen in Fig. 3.

The parts being assembled as above described, if it is desired to place the pedal in the position of least leverage the collar is rotated on the arbor B until the stud 11 on lever E enters the hole 6 in the top of the arbor, when the parts will be locked in the position shown in Fig. 1. Now if it is desired to place the pedal in the position of greatest leverage this may be accomplished in either of two ways—first, by the rider placing his foot on the rear end of lever E, when a slight pressure thereon will cause the stud 11 to be lifted from hole 6 and thus permit the collar and its accompanying parts to be revolved on the arbor until the stud 11 enters the other hole 6 in the opposite side of the arbor, this engagement, owing to spring 13, being automatic; secondly, the rider may, by pressing with the edge of his foot against button 15, cause the push-pin F to be moved inward, and then, as the pedal-crank revolves, the end of the pin will engage with the under side of lip 12 of lever E, when a farther revolution of the crank will lift the lever and remove stud 11 from hole 6 and permit the collar to be revolved as before, the parts assuming the positions shown in Fig. 2 in dotted lines. It is evident that if the parts are originally in the position of greatest leverage a similar operation to the above described will cause them to assume a position of least leverage.

It will be seen that the change from greatest to least leverage, and vice versa, can be readily accomplished either while the bicycle is in or out of motion, and that the operation of the parts is automatic, requiring but a simple pressure from the foot of the rider.

Having thus described my invention, what I claim as new, and desire to secure by Letters Patent, is—

1. In a bicycle, the combination, with the pedal-crank, of an arbor secured to the free end of the crank, a collar rotatively mounted on the arbor and provided with an arm, a pedal secured to said arm, a lever carried by the collar and provided with means for locking the latter to the arbor in variable positions, and a push-pin carried by the pedal and adapted to operate said lever, substantially as described.

2. In a bicycle, the combination, with the pedal-crank, of an arbor secured to the free end of the crank, said arbor being formed with two diametrically-opposite holes, a collar rotatively mounted on said arbor and provided with an arm, a pedal secured to said arm, a spring-actuated lever carried by the collar and provided with a stud adapted to enter either of the holes in the arbor and lock the collar, a laterally-extending lip formed on the lever, and a push-pin carried by the pedal and adapted to contact with the lip and operate the lever, substantially as described.

In testimony whereof I affix my signature in presence of two witnesses.

AUSTIN T. BASCOM.

Witnesses:
 LOUIS PFOADT,
 WEB FRY.